(12) United States Patent
Petrariu et al.

(10) Patent No.: US 11,519,323 B1
(45) Date of Patent: Dec. 6, 2022

(54) PRECHAMBER SPARKPLUG ASSEMBLY HAVING SPARKPLUG HOUSING STRUCTURED FOR LIQUID COOLING

(71) Applicant: Caterpillar Inc., Peoria, IL (US)

(72) Inventors: Viorel Petrariu, Lafayette, IN (US); Jonathan Richard Chittenden, West Lafayette, IN (US); James Jay Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/478,421

(22) Filed: Sep. 17, 2021

(51) Int. Cl.
| F02B 19/12 | (2006.01) |
| F02F 1/36 | (2006.01) |
| H01T 13/16 | (2006.01) |
| F01P 3/16 | (2006.01) |
| F02F 1/24 | (2006.01) |

(52) U.S. Cl.
CPC ............... F02B 19/12 (2013.01); F01P 3/16 (2013.01); F02F 1/242 (2013.01); F02F 1/36 (2013.01); H01T 13/16 (2013.01)

(58) Field of Classification Search
CPC ... F02B 19/12; F01P 3/16; F02F 1/242; F02F 1/36; H01T 13/16
See application file for complete search history.

(56) References Cited

U.S. PATENT DOCUMENTS

| 3,796,909 A | 3/1974 | Chang et al. | |
| 5,662,082 A * | 9/1997 | Black | F02B 19/16 |
| | | | 29/888.01 |
| 6,019,081 A * | 2/2000 | Divecha | F02F 1/242 |
| | | | 123/41.32 |
| 10,145,292 B1 * | 12/2018 | Cress | H01T 13/54 |
| 11,002,219 B1 * | 5/2021 | Cress | H01T 13/08 |
| 2002/0104507 A1 * | 8/2002 | Riggs | F02B 19/12 |
| | | | 123/266 |
| 2011/0005478 A1 * | 1/2011 | Taliaferro | F02B 19/1095 |
| | | | 123/285 |
| 2016/0003150 A1 | 1/2016 | DiCinto et al. | |
| 2016/0333771 A1 * | 11/2016 | Willi | F02B 19/1009 |
| 2016/0348570 A1 * | 12/2016 | Willi | F02B 19/12 |
| 2016/0363094 A1 * | 12/2016 | Luft | F01P 3/16 |
| 2019/0284985 A1 * | 9/2019 | Perr | H01T 13/54 |

FOREIGN PATENT DOCUMENTS

| DE | 102012205552 A1 | 10/2013 |
| DE | 102012108977 B3 | 3/2014 |
| JP | 6597478 B2 | 10/2019 |

* cited by examiner

*Primary Examiner* — Joseph J Dallo
*Assistant Examiner* — Kurt Philip Liethen
(74) *Attorney, Agent, or Firm* — Brannon Sowers & Cracraft PC

(57) ABSTRACT

A prechamber sparkplug assembly includes a sparkplug, and a sparkplug housing having a prechamber tip. The sparkplug housing includes a plug bore centered on a longitudinal axis of the sparkplug housing and receiving the sparkplug, an inside radial wall extending around the plug bore, and an outside radial wall. A cooling cavity is formed between the inside radial wall and the outside radial wall. Coolant ports extend through the outside radial wall and fluidly connect to the cooling cavity to place the cooling cavity in fluid communication with a water jacket in a cylinder head.

20 Claims, 3 Drawing Sheets

PRECHAMBER SPARKPLUG ASSEMBLY HAVING SPARKPLUG HOUSING STRUCTURED FOR LIQUID COOLING

TECHNICAL FIELD

The present disclosure relates generally to a prechamber sparkplug, and more particularly to a prechamber sparkplug housing structured for liquid cooling.

BACKGROUND

Internal combustion engines are well known throughout the world for purposes ranging from vehicle propulsion to electrical power generation and production of rotational power for various purposes such as gas and liquid conveyance and pressurization. Combustion of a fuel with air in combustion cylinders in the engine drives piston motion to rotate a crankshaft. The combustion process also subjects components of the engine to mechanical stress and relatively high temperatures. In most instances, active cooling of an engine by way of a liquid coolant conveyed through the engine hardware components is required.

Coolant channels and cavities are formed in various engine components to convey a coolant liquid through the engine to dissipate excess heat. Water jackets and various other plumbing structures of virtually innumerable types have been proposed over the years in efforts to optimally manage engine temperatures. An igniter such as a prechamber sparkplug or a prechamber ignition device is positioned in a cylinder head in many common engine configurations. Igniters can be sensitive to excess temperatures, with overheating of an igniter causing challenges such as preignition, performance degradation, or even failure of the igniter.

In recent years engineers have been increasingly motivated to optimize coolant flow and cooling efficacy for engine components, including igniters. Optimized cooling can provide various operating benefits and sometimes increased engine power density. U.S. Pat. No. 10,385,800 is directed to a cylinder head assembly where a coolant passage cross-drilled through a cylinder head provides a pumped flow of coolant into direct heat transference contact with components of an igniter or ignition assembly. The strategy set forth in the '800 patent undoubtedly has applications, there is nevertheless always room for improvement and development of alternative strategies.

SUMMARY

In one aspect, a prechamber sparkplug assembly includes a sparkplug, and a sparkplug housing defining a longitudinal axis extending between a first axial housing end, and a second axial housing end including a prechamber tip having at least one ignition opening formed therein. The sparkplug housing further includes a plug bore centered on the longitudinal axis and receiving the sparkplug, an inside radial wall extending circumferentially around the plug bore, and an outside wall. A cooling cavity is formed between the inside radial wall and the outside wall, and a plurality of coolant ports extend through the outside wall and fluidly connect to the cooling cavity.

In another aspect, a sparkplug housing includes a housing body defining a longitudinal axis extending between a first axial housing end, and a second axial housing end including a prechamber tip having at least one ignition opening formed therein. The housing body further includes a plug bore centered on the longitudinal axis, an inside radial wall extending circumferentially around the plug bore, and an outside radial wall. A cooling cavity extends radially between the inside radial wall and the outside radial wall, and a plurality of coolant ports are formed in the sparkplug body and fluidly connect to the cooling cavity.

In still another aspect, a method of cooling a sparkplug includes conveying a coolant liquid into a cooling cavity formed between an outside radial wall and an inside wall in a sparkplug housing, and dissipating heat by way of material of the inside radial wall from a sparkplug to coolant liquid within the cooling cavity. The method further includes dissipating heat from a prechamber tip of the sparkplug body to coolant liquid within the cooling cavity, and conveying coolant liquid out of the cooling cavity.

DETAILED DESCRIPTION

Figure 1:
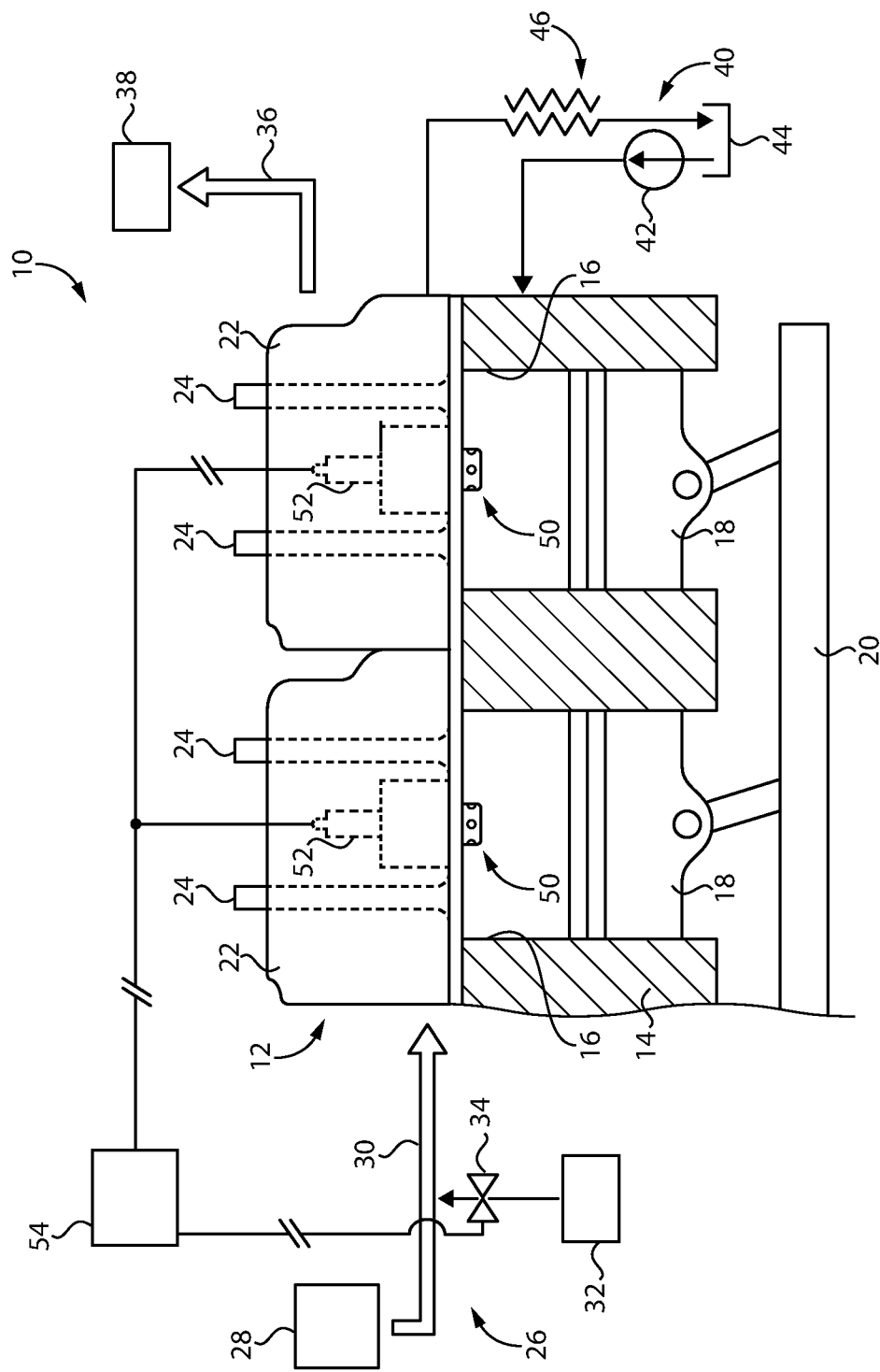
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having a cylinder block 14 with a plurality of combustion cylinders 16 formed therein. Pistons 18 are positioned one within each of combustion cylinders 16 and movable between a top-dead-center position and a bottom-dead-center position in a generally conventional manner to rotate a crankshaft 20 for propelling a vehicle, operating a compressor, a pump, or an electrical generator, or for any other known engine application. A cylinder head 22 is attached to cylinder block 14 and includes engine valves 24 supported therein and movable to open and close intake and exhaust connections to each of combustion cylinders 16. Engine valves 24 will typically include two intake valves and two exhaust valves per cylinder. In a practical implementation, engine 12 will operate in a conventional four-stroke pattern.

Engine system 10 further includes an intake system 26 having a filtered air inlet 28, and an intake conduit 30 extending to cylinder head 22, typically by way of an intake manifold (not shown). An exhaust conduit 36 extends from cylinder head 22 to an exhaust outlet 38 such as an exhaust stack or tailpipe. An exhaust manifold (not shown) will typically be placed between cylinder head 22 and exhaust conduit 36. Cylinder head 22 can include a plurality of individual cylinder head units each associated with one of combustion cylinders 16, but in other embodiments could include a slab cylinder head or the like associated with more than one of combustion cylinders 16. Combustion cylinders 16 can be of any number and in any suitable arrangement such as a V-pattern, an in-line pattern, or still another.

A fuel supply 32 is also provided in or in association with engine system 10 and can include a supply of gaseous fuel 32 such as a compressed gaseous fuel storage tank, a line gas supply, a cryogenically stored liquified gaseous fuel, or still another. Example gaseous fuels include methane, ethane, natural gas, biogas, landfill gas, mine gas, premixed gasoline, and various others. In the illustrated embodiment gaseous fuel supply 32 delivers gaseous fuel by way of an electronically controlled admission valve 34 directly into intake conduit 30. Embodiments are contemplated where admission valve 34 fluidly connects to intake conduit 30 at a location upstream of a turbocharger compressor (not shown), as well as where admission valve 34 fluidly connects to an intake manifold or to an intake runner downstream of a turbocharger compressor. In still other instances a gaseous fuel could be directly injected into each one of combustion cylinders 16.

Engine system 10 further includes a cooling system 40 having a coolant pump 42 structured to convey a liquid coolant such as engine coolant, water, blends, et cetera, to cylinder block 14. Cooling system 40 may receive drained coolant having exchanged heat with engine 12 and returns the same to a coolant tank 44 that is located downstream of, or integrated with, a heat exchanger 46. The present disclosure is applicable without limitation to any type, arrangement or plumbing configuration of an engine cooling system employing a liquid coolant circulated through engine components.

Engine system 10 further includes a plurality of prechamber sparkplug assemblies 50 each associated with one of combustion cylinders 16. Each prechamber sparkplug assembly 50, hereinafter referred to at times in the singular, includes a prechamber sparkplug 52 electrically connected to an engine electronic control unit 54 in a generally conventional manner. As will be further apparent from the following description prechamber sparkplug assemblies 50 are structured for unique, direct cooling with coolant liquid conveyed through cylinder head 22 by way of cooling system 40.

Figure 2:
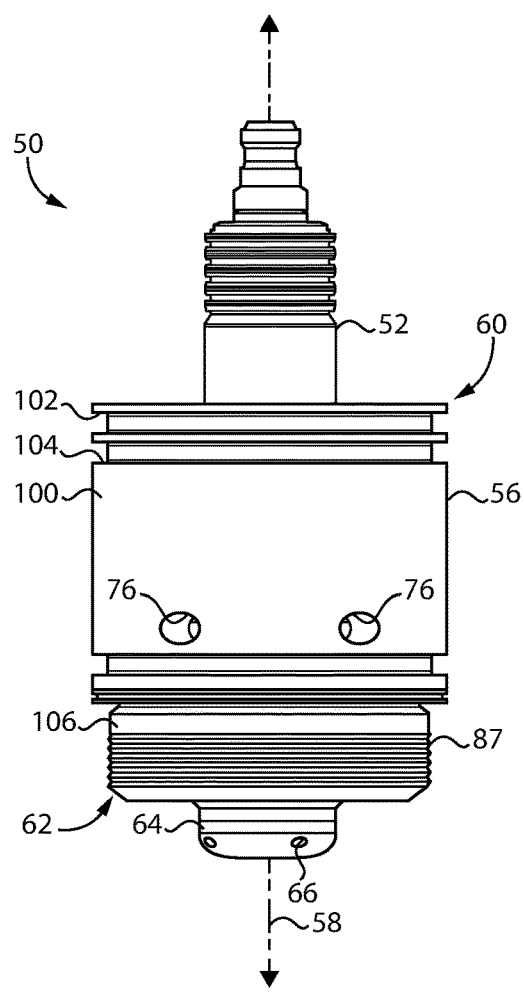
FIG. 2 is a diagrammatic view of a sparkplug assembly, according to one embodiment.
Figure 3:
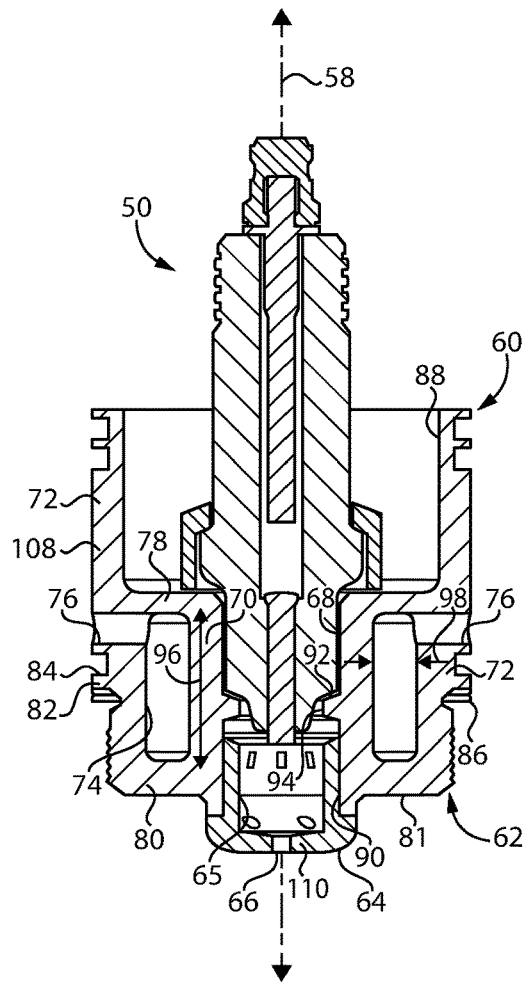
FIG. 3 is a sectioned diagrammatic view of a sparkplug assembly, according to one embodiment.

Referring also now to FIGS. 2 and 3, there are shown features of prechamber sparkplug assembly 50 in further detail. Prechamber sparkplug assembly 50 (hereinafter "assembly 50") includes a sparkplug housing 56 defining a longitudinal axis 58 extending between a first axial housing end 60, and a second axial housing end 62 including a prechamber tip 64. Prechamber tip 64 is positionable in combustion cylinder 16 to produce hot jets of rapidly combusting fuel conveyed into a chamber or spark cavity 65 in prechamber tip 64 and ignited by way of an electrical spark produced at an electrode of prechamber sparkplug 52. In the illustrated embodiment the at least one ignition opening 66 can include a centrally located ignition opening on longitudinal axis 58 and a plurality of radially outward ignition openings circumferentially distributed around longitudinal axis 58. Delivery of fuel and air into spark cavity 65 can occur by way of ignition openings 66 directly from combustion cylinder 16 in a generally known manner.

Sparkplug housing 56 further includes a plug bore 68 centered on longitudinal axis 58 and receiving sparkplug 52. Sparkplug housing 56 further includes an inside radial wall 70 extending circumferentially around plug bore 68, and an outside wall 72, which may be an outside radial wall 72. The terms "radial" and "axial" are used herein in reference to longitudinal axis 58. Thus, a radial wall extends generally parallel to longitudinal axis 58 and including a wall surface facing a radially inward or a radially outward direction normal to longitudinal axis 58. An axial wall is a wall extending generally perpendicular to longitudinal axis 58 and including a wall surface facing an axial direction parallel to longitudinal axis 58. Outside radial wall 72 may also extend circumferentially around plug bore 68 at a location radially outward of inside radial wall 70. A cooling cavity 74 is formed between inside radial wall 70 and outside radial wall 72. Inside radial wall 70 forms a surface of plug bore 68 and also forms a wetted surface of cooling cavity 74. Cooling cavity 74 may be fully circumferential of longitudinal axis 58.

A plurality of coolant ports 76 are formed in and extend through outside radial wall 72 and fluidly connect to cooling cavity 74. As further discussed herein coolant ports 76 are positioned to convey liquid coolant into cooling cavity 74 and out of cooling cavity 74 when prechamber sparkplug assembly 50 is installed for service in cylinder head 22. An arrangement of coolant ports 76 when prechamber sparkplug assembly 50 is installed in cylinder head 22 imparts tendencies for some of coolant ports 76 to function as supply or inlet ports and others of coolant ports 76 to function as return or outlet ports, as further discussed herein. A number of coolant ports 76 may be from 6 to 10. In a refinement, a number of coolant ports 76 is exactly 8. Coolant ports 76 may have a regular circumferential distribution around longitudinal axis 58. In one implementation, coolant ports 76 extend straight through outside radial wall 72 in a radially inward direction to cooling cavity 74 and each lies on a radius of a circle centered on longitudinal axis 58.

Sparkplug housing 56 may further include a housing body also identified with numeral 56 and including a first housing piece 108 forming inside radial wall 70 and outside radial wall 72, and a second housing piece 110 attached to first housing piece 108 and forming prechamber tip 64. The terms sparkplug housing and housing body are used interchangeably herein. First housing piece 108 may include a one-piece casting, for example, with second housing piece 110 including a machined, cast, or otherwise formed part attached to the one-piece casting, such as by way of an interference-fit in some embodiments. In other instances, first housing piece 108 and second housing piece 110 could be formed as a single piece.

Sparkplug housing 56 may further include an inside axial wall 78, and an outside axial wall 80 forming an exposed axial end surface 81 extending circumferentially around prechamber tip 64. Cooling cavity 74 extends circumferentially around longitudinal axis 58 and axially between inside axial wall 78 and outside axial wall 80. Sparkplug housing 56 may further include an outside stop shoulder 82 located axially between first axial housing end 60 and second axial housing end 62, and in a refinement axially between coolant ports 76 and second axial housing end 60. A crush washer 86 may be installed on sparkplug housing 56 in contact with outside stop shoulder 82, forming a fluid seal with cylinder head 22 when installed therein. Also in the illustrated embodiment an O-ring groove 84 is formed in outside radial wall 72 axially between outside stop shoulder 82 and coolant ports 76. As can also be seen from the drawings outside radial wall 72 includes a first outer surface 100 adjacent to first axial housing end 60 and having a first O-ring groove 102 and a second O-ring groove 104 formed therein. Outside radial wall 72 further includes a second outer surface 106 adjacent to second axial housing end 62 and forming external threads 87 upon outside radial wall 72.

Outside radial wall 72 further forms a first bore 88 opening at first axial housing end 60 and coaxially arranged with plug bore 68. Inside radial wall 70 forms a second bore 90 coaxially arranged with plug bore 68 and extending between plug bore 68 and second axial housing end 62. Sparkplug housing 56 also includes a conical plug seat 92 axially between plug bore 68 and second bore 90. Plug seat 92 and sparkplug 52 form a combustion seal when clamped together, typically with a crush washer or other suitable sealing element clamped therebetween. Plug seat 82 also forms a central opening 94 for receiving a sparkplug tip including spark electrodes of sparkplug 52 therethrough. As can also be seen in FIG. 3, cooling cavity 74 defines a cross-sectional shape. The cross-sectional shape may be uniform circumferentially around longitudinal axis 58, and it can be noted the cross-sectional shape is greater in axial height 96 than in radial width 98.

INDUSTRIAL APPLICABILITY

Figure 4:
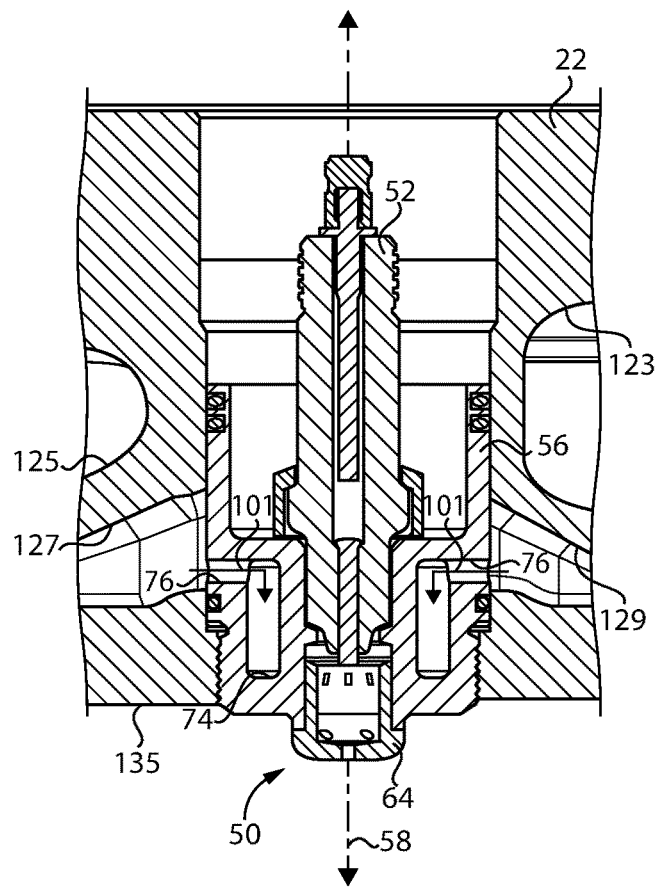
FIG. 4 is a sectioned view of a sparkplug assembly assembled with a cylinder head, according to one embodiment.
Figure 5:
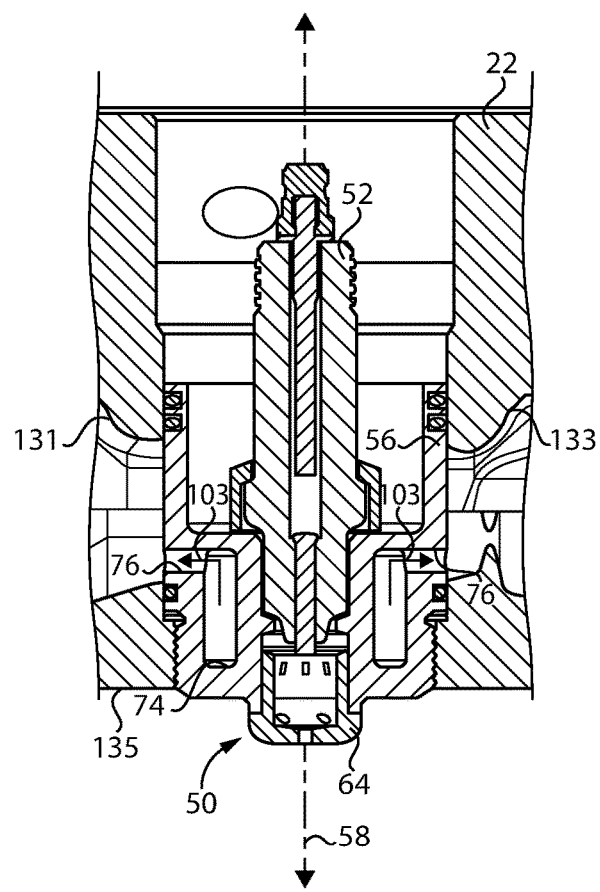
FIG. 5 is a sectioned diagrammatic view of a sparkplug assembly and cylinder head as in FIG. 4, rotated 90° from the FIG. 4 illustration.

Referring also now to FIGS. 4 and 5, there is shown prechamber sparkplug assembly 50 as it might appear installed in cylinder head 22 for service. In FIG. 4 the section plane depicted is a so-called crank plane that includes therein an axis of rotation of crankshaft 20. In FIG. 5 the section plane is rotated approximately 90° from the section plane of FIG. 4. Cylinder head 22 includes a fire deck 135 exposed to combustion cylinder 16. Sparkplug housing 56 is within an igniter bore 105 extending through cylinder head 22 and threaded engaged with cylinder head 22, such that prechamber tip 64 extends downward from fire deck 135 into combustion cylinder 16. In FIG. 4 portions of an intake conduit 123 and an exhaust conduit 125 are also shown. Two coolant feed paths 127 and 129 provide a flow of coolant liquid to be conveyed through coolant ports 76 into cooling cavity 74. Coolant feed paths 127 and 129 extend from a lower water jacket region in cylinder head 22 and feed liquid coolant to some of coolant ports 76 for conveying into cooling cavity 74.

In FIG. 5, coolant feed paths 131 and 133 are shown and are fluidly connected to different coolant ports 76. Coolant feed paths 131 and 133 extend upwardly in cylinder head 22 to allow a flow of coolant liquid conveyed out of cooling cavity 74 to be conveyed into an upper water jacket region of cylinder head 22. Coolant ports 76 shown in FIG. 4 are understood to have a first circumferential distribution around longitudinal axis 58, and coolant ports 76 shown in FIG. 5 are understood to have a second circumferential distribution around longitudinal axis 58 angularly offset from the first circumferential distribution. Based upon the differential angular orientations of coolant ports 76 in FIG. 4 versus the angular orientations of coolant ports 76 shown in FIG. 5, circumferentially around longitudinal axis 58, the respective coolant ports 76 are arranged, respectively, to convey liquid coolant into and out of cooling cavity 74.

It will be appreciated that coolant feed paths 127 and 129 will be fluidly connected to coolant feed paths 133 and 135, however, the geometry of cylinder head 22 will impart a tendency for liquid coolant circulated through cylinder head 22 to flow into those coolant ports 76 generally aligned with coolant feed paths 127 and 129 and to flow out of those coolant ports 76 generally aligned with coolant feed paths 133 and 135. For example, coolant ports 76 serving as supply ports might be located at twelve o'clock and six o'clock positions and coolant ports 76 serving as return ports might be located at three o'clock and nine o'clock positions, circumferentially around longitudinal axis 58. Coolant ports between the described positions could be either of supply or return ports or could more or less be passive without a bias toward supply or return, depending upon the configuration of the various coolant feed paths in cylinder head 22. The described flow patterns may thus occur based on the arrangement of the various coolant ports and coolant feed paths, with the number of coolant ports 76, for example exactly eight, providing some tolerance for angular orientation of prechamber sparkplug assembly 50 within cylinder head 22 to always ensure that at least some coolant ports 76 will tend to convey liquid coolant in and some tend to convey liquid coolant out. Within cooling cavity 74 the liquid coolant will tend to flow generally circumferentially around longitudinal axis 58, such that heat is dissipated from sparkplug 52 and from prechamber tip 64 to liquid coolant through material of prechamber sparkplug housing forming inside radial wall 70 as well as through other parts of prechamber sparkplug housing 50.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A prechamber sparkplug assembly comprising:
a sparkplug;
a sparkplug housing defining a longitudinal axis extending between a first axial housing end formed by a first housing piece, and a second axial housing end formed by a second housing piece and including a prechamber tip having at least one ignition opening formed therein;
the sparkplug housing further including a plug bore centered on the longitudinal axis and receiving the sparkplug, and the first housing piece including an inside radial wall extending circumferentially around the plug bore and circumferentially around the prechamber tip, and an outside wall; and
a cooling cavity extends radially between the inside radial wall and the outside wall, and a plurality of coolant ports extend through the outside wall and fluidly connect to the cooling cavity.

2. The assembly of claim 1 wherein:
the sparkplug housing further includes an inside axial wall, and an outside axial wall forming an exposed axial end surface extending circumferentially around the prechamber tip; and
the cooling cavity extends circumferentially around the longitudinal axis and axially between the inside axial wall and the outside axial wall.

3. The assembly of claim 2 wherein the sparkplug housing further includes an outside stop shoulder located axially between the plurality of coolant ports and the second axial housing end.

4. The assembly of claim 3 wherein an O-ring groove is formed in the outside wall axially between the outside stop shoulder and the plurality of coolant ports.

5. The assembly of claim 1 wherein the plurality of coolant ports have a circumferential distribution in the outside wall.

6. The assembly of claim 5 wherein a number of the plurality of coolant ports is from 6 to 10.

7. The assembly of claim 1 wherein the sparkplug housing includes external threads upon the outside wall.

8. The assembly of claim 1 wherein the outside wall forms a bore opening at the first axial housing end and coaxially arranged with the plug bore.

9. The assembly of claim 1 wherein the inside radial wall includes a cylindrical outer surface and the outside wall includes a cylindrical inner surface, and the cooling cavity is defined between the cylindrical outer surface and the cylindrical inner surface.

10. A prechamber sparkplug housing comprising:
a housing body defining a longitudinal axis extending between a first axial housing end, and a second axial housing end including a prechamber tip having at least one ignition opening formed therein;
the housing body further including a plug bore centered on the longitudinal axis, an inside radial wall extending circumferentially around the plug bore, and an outside radial wall;
a cooling cavity extends radially between the inside radial wall and the outside radial wall, and a plurality of coolant ports are formed in the housing body and fluidly connect to the cooling cavity;
the housing body further includes a plug seat axially between the plug bore and the second bore and forming a central opening for receiving a sparkplug tip therethrough; and
the cooling cavity extends axially between a first location upon a first axial side of the plug seat, and a second location upon a second axial side of the plug seat.

11. The prechamber sparkplug housing of claim 10 wherein the outside radial wall includes a first outer surface adjacent to the first axial housing end and having an O-ring groove formed therein, and a second outer surface adjacent to the second axial housing end and forming external threads.

12. The prechamber sparkplug housing of claim 10 further including an outside stop shoulder located axially between the first axial housing end and the second axial housing end.

13. The prechamber sparkplug housing of claim 12 wherein an O-ring groove is formed in the outside radial wall adjacent to the stop shoulder.

14. The prechamber sparkplug housing of claim 10 wherein:
the housing body further includes an inside axial wall;
the plurality of coolant ports are formed in the outside radial wall; and
the cooling cavity extends axially between the inside axial wall and the prechamber tip.

15. The prechamber sparkplug housing of claim 14 wherein a number of the plurality of coolant ports is from 6 to 10.

16. The prechamber sparkplug housing of claim 10 wherein the cooling cavity defines a cross-sectional shape greater in axial height than in radial width circumferentially around the longitudinal axis.

17. The prechamber sparkplug housing of claim 10 wherein:
the outside radial wall forms a first bore coaxially arranged with the plug bore and opening at the first axial housing end; and
the inside radial wall forms a second bore coaxially arranged with the plug bore and extending between the plug bore and the second axial housing end.

18. A method of cooling a sparkplug comprising:
conveying a coolant liquid into a cooling cavity formed between an outside radial wall and an inside wall in a first housing piece of a sparkplug housing;
dissipating heat by way of material of the inside radial wall from a sparkplug to coolant liquid within the cooling cavity;
dissipating heat by way of material of the inside wall from a prechamber tip of a second housing piece of the sparkplug housing to coolant liquid within the cooling cavity; and
conveying coolant liquid out of the cooling cavity.

19. The method of claim 18 wherein:
the conveying of coolant liquid into a cooling cavity includes conveying coolant liquid at least predominantly through coolant ports formed in the outside wall and having a first circumferential distribution around a longitudinal axis of the sparkplug housing; and
the conveying of coolant liquid out of the cooling cavity includes conveying coolant liquid at least predominantly through coolant ports in the outside wall having a second circumferential distribution around the longitudinal axis.

20. The method of claim 19 wherein the first circumferential distribution is angularly offset from the first second circumferential distribution circumferentially around the longitudinal axis.

* * * * *